United States Patent [19]

DiCroce et al.

[11] Patent Number: 5,850,173

[45] Date of Patent: *Dec. 15, 1998

[54] VEHICLE ALARM SYSTEM

[75] Inventors: John DiCroce, Oceanside, N.Y.; Scott Christie, Weymouth, Mass.

[73] Assignee: Audiovox Corp., Hauppauge, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 732,585

[22] Filed: Oct. 15, 1996

Related U.S. Application Data

[63] Continuation of Ser. No. 141,195, Oct. 21, 1993, abandoned.

[51] Int. Cl.$^6$ .................................................. B60R 25/10
[52] U.S. Cl. ......................... 340/426; 180/287; 307/10.2; 307/10.6; 340/430
[58] Field of Search .................................... 340/426, 428, 340/430; 180/287; 307/10.2, 10.6

[56] References Cited

U.S. PATENT DOCUMENTS

| | | | |
|---|---|---|---|
| 3,649,962 | 3/1972 | Bedard et al. | 340/430 |
| 4,151,507 | 4/1979 | Willis | 340/430 |
| 4,159,466 | 6/1979 | Mengel | 340/430 |
| 4,174,516 | 11/1979 | Cleary | 340/430 |
| 4,297,674 | 10/1981 | Merten | 340/430 |
| 4,383,242 | 5/1983 | Sassover et al. . | |
| 4,479,110 | 10/1984 | Cipri | 340/430 |
| 4,665,379 | 5/1987 | Howell et al. | 340/426 |
| 4,737,770 | 4/1988 | Brunius et al. . | |
| 4,866,417 | 9/1989 | Defino et al. . | |
| 4,881,148 | 11/1989 | Lambroopoulos et al. . | |
| 4,887,064 | 12/1989 | Drori et al. . | |
| 4,890,108 | 12/1989 | Drori et al. . | |
| 4,975,678 | 12/1990 | Hwang | 340/430 |
| 5,018,667 | 5/1991 | Drori et al. . | |
| 5,049,867 | 9/1991 | Stouffer . | |
| 5,079,538 | 1/1992 | DeFino et al. | 340/426 |
| 5,157,375 | 10/1992 | Drori et al. . | |
| 5,412,370 | 5/1995 | Berman et al. | 340/430 |
| 5,412,371 | 5/1995 | Kaplan | 340/426 |

FOREIGN PATENT DOCUMENTS 1056062   1/1967   United Kingdom .................... 340/430

OTHER PUBLICATIONS

Audiovox, Model Pro 92BT Owners's Manual/Transmitter Programming Guide Oct. 1993.
Audiovox, Model Pro 9249 Owner's Manual/Active Passive Operation Model Pro 9249 Installation Manual, Oct. 1993.
Audiovox, Model Pro–9149 Owner's Manual, Passive Operation Model Pro–9149 Owner's Manual, Active Operation Model Pro–9149 Installation Guide, Keyless Entry Auto Security System Oct. 1993.
Audiovox, Model Pro–9144/Owner's Manual/Active Operation Model Pro–9144/Remote Control Auto Security System Installation Manual Model Pro–9144/Owner's Manual/Passive Operation Sep. 1993.

*Primary Examiner*—Brent A. Swarthout
*Attorney, Agent, or Firm*—Graham & James LLP

[57] ABSTRACT

A vehicle alarm system with a sensor for detecting a change in the alarm system from an armed not triggered state to an armed triggered state, an override switch operable only when the alarm system is in the armed triggered state, to stop the alarm from sounding in the armed triggered state, an ignition switch, an ignition sensor, and a controller for switching the alarm system from the armed triggered state to the disarmed state when the ignition sensor supplies a signal indicating ignition on while a timing circuit is activated and maintaining the alarm system in an armed triggered state when no ingition signal is supplied while the timing circuit is activated.

10 Claims, 9 Drawing Sheets

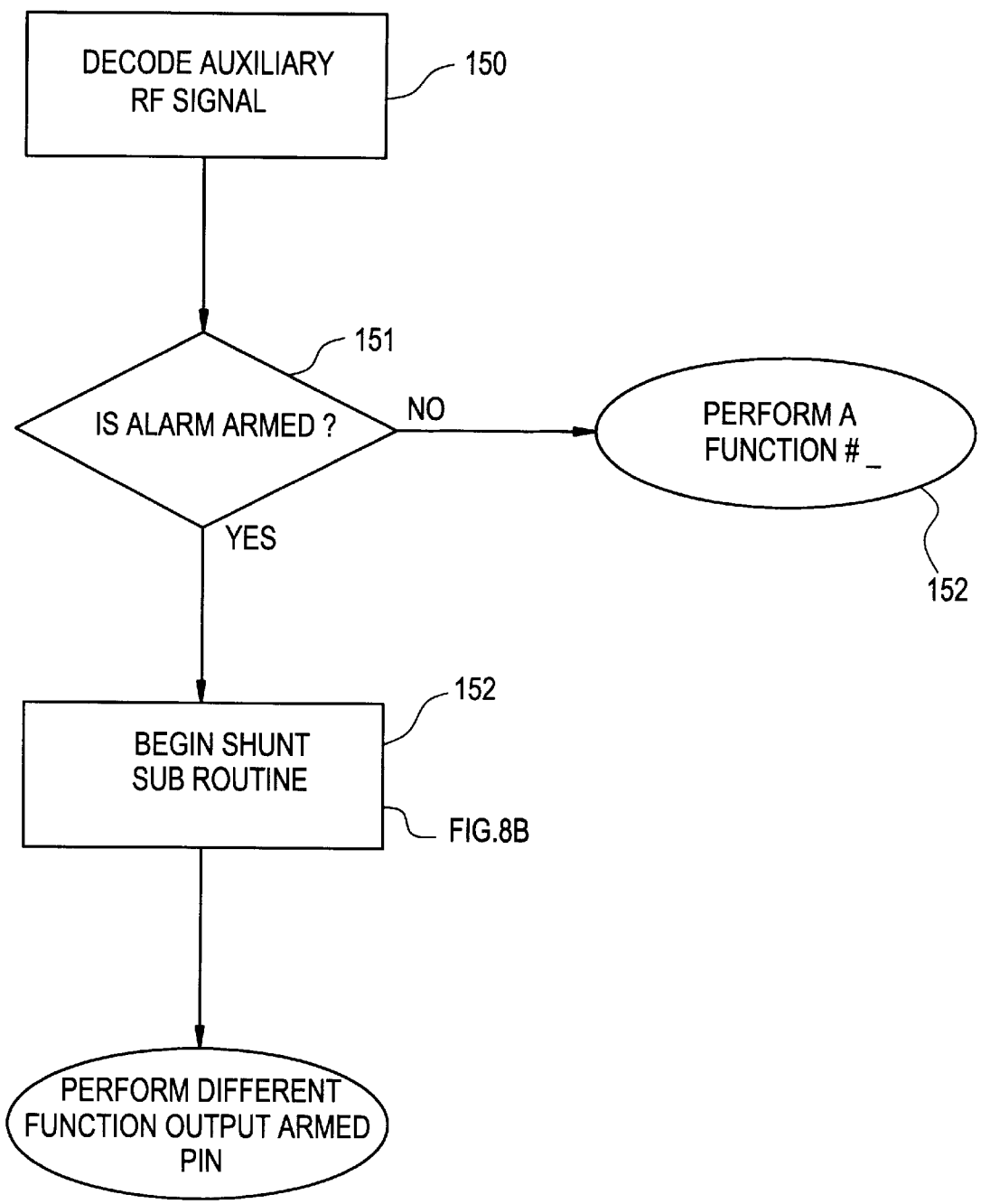

VEHICLE ALARM SYSTEM

This application is a continuation of Ser. No. 08/141,195 filed Oct. 21, 1993, abandoned.

BACKGROUND OF THE INVENTION

1. Field of the Invention

The invention relates generally to vehicle control systems and particularly to automobile alarm systems.

2. Discussion of the Prior Art

This past year in the United States, there were reported to the police attempted or successful forced entry to automobiles at the rate of 1 entry every 20 seconds, or more than 1.5 million reported attempted or actual automobile thefts. In an attempt to reduce break-in to and theft of and from automobiles, many new cars are fitted with alarm systems, and older cars without these systems are having systems added, and some cars with systems already installed are the having existing systems upgraded or improved by adding new features.

Professional criminals who encounter alarm systems, have become adept at bypassing or rendering the systems ineffective. Thus, there is need for better systems which are more difficult to avoid, and which will successfully deter criminals even the most sophisticated ones.

At the present time, there are many available automobile alarm systems are on sale. Three prior art examples are the model PRO9249, model PRO9149, and model PRO 9144 made by the Audiovox Corporation of Hauppauge, N.Y., the assignee of the present invention. A copy of the installation manuals and owner's manuals for these three models are attached to this application and made part hereof.

A basic automobile alarm system includes a central controller, inputs or sensors, (e.g. to sense if a door is open or closed) and outputs, (e.g. a siren, lights). The system is usually always on, i.e. as long as the automobile battery is connected, although some units may contain backup batteries. The system is either armed, (i.e. ready to sense an input sensor and activate an output (in response thereto), or disarmed, (i.e., not to be activated by a sensor). When the system is armed, and the sensor is activated, (e.g. a door is opened), then the system is triggered and an output (e.g. siren) is activated.

As shown in the cited manuals, the sensors include door sensor, trunk sensor, hood sensor, motion sensor. The typical outputs are siren, horn, door locks open and close, trunk release, hood release, ignition switch cut-out, solenoid disconnect, dome light switch.

FEATURES AND OBJECTS OF THE INVENTION

Many automobile alarm systems have a remote control door unlock feature. Here, when the driver approaches the automobile, the doors are locked, and the system is armed, the driver activates a small transmitter, which usually is on the automobile ignition key, or attached to the key, and this causes the system to disarm and all of the automobile doors to unlock. Recently there has been a spate of crimes where thieves hide next to an automobile, and when the driver unlocks the doors with the door unlock transmitter, the thief comes out of hiding and enters through one of the doors, usually the front passenger door. The driver then either flees, or is accosted in the automobile by the thief. The present invention inhibits such a thief from entering the automobile, by providing a two step door unlock feature. Here the driver approaches the automobile, the doors are locked and the system is armed. A first activation of the transmitter unlocks only the front driver's door (and also disarms the system). If the driver wishes to unlock all the doors, then the transmitter is activated twice, but in rapid succession, e.g. within 5 seconds. The first, activation unlocks the driver's door (and also disarms the system) and second unlocks all the doors. A second activation of the transmitter, but after the short time period, e.g. after the 5 seconds, will lock all doors, and arm the system. Thus, a driver who approaches the automobile, remotely unlocks only the driver's door, and then sees a suspicious person, near the automobile, has the option of either entering the driver's door and driving away (the suspicious person is locked out of all the other doors), or of activating the transmitter again, after the short, e.g. 5 second, time delay. This locks all doors and arms the system. The driver then leaves the area and returns with an attendant or helper. In all events the driver is more secure with this new two step door open feature.

Thus, an object of the invention is to provide a system for thwarting would-be thieves who hide near parked automobiles and enter the automobiles when the drivers unlock the doors with a remote control door unlock.

Another object of the invention is to provide security for the driver when unlocking doors of a parked automobile, by allowing the driver to selectively unlock only the driver's door, or all the doors, and if needed to quickly relock all the doors (and rearm the alarm system).

Another aspect of the invention concerns installation of alarm systems, and re-connecting the battery in automobiles which have alarm systems, and reduction of automobile theft.

In the installation of alarm systems in the field, i.e. after the automobile has been manufactured, it is customary for the installer to disconnect the automobile battery prior to installing the alarm system. After the system, with its sensors, outputs, and wiring is installed, then the battery is reconnected. When the alarm system is in place and power is re-connected (and this includes the battery having been disconnected or run down and is subsequently reconnected or recharged), the alarm system comes on armed, and prior art systems perform two functions which at that moment can be undesirable. First, the doors are locked. Second, the siren goes off. The owner or mechanic may find at that time that the keys are in the ignition, and the system has locked the automobile doors. If there is not an extra set of keys available, then there is no small inconvenience. Further, the siren going off in a garage (or in any close quarters where there are workers) is not only disturbing, but may be a safety hazard, or legal violation, especially in a large garage which installs several systems each day.

To overcome these shortcomings, the present invention provides a novel circuit for disconnecting the alarm system automatic door lock feature when the battery is first connected or reconnected in the car. Also the siren may be temporarily disabled when the power first comes on.

A further advantage of this aspect of the invention is anti-theft. A typical attempted theft of the automobile, follows a usual sequence. First, disconnect the battery. Second, turn on the ignition. The ignition on may involve the jumping of a wire, or a cut-out of the ignition lock and then jumping of a wire. Third, reconnect the battery. With the new invention, when the battery is reconnected by a thief, he is not immediately aware that the system is on, since there is no siren sounding. But when the system is on, it is triggered and automatically disconnects the starter which is the usual routine on triggering. The automobile is now inhibited from starting and the thief, if he is to succeed in stealing the car, must spend additional time to connect the starter. Typically, the thief would have to find the starter relay and by-pass it, again disconnecting the battery in the process. The longer it takes for a thief to steal a automobile (perhaps with lights flashing, and other security devices activated), the greater the chances of his being caught or interrupted in the theft.

Thus, a further object of the present invention is to provide a novel alarm system which can be more easily and safely installed. Also, to install a system without unwanted noise from the system, and without the installer having the automobile locked out with the keys inside the automobile.

Another object is to achieve the above goals when the battery is reconnected or recharged.

A still further object is a system which makes it more difficult for a thief to steal the automobile.

Another embodiment of the invention is an improvement in passive arming of the system. Some prior art systems have a passive arming feature, e.g. if the driver stops and leaves the automobile, without arming the system, then the system will after, e.g. 30 seconds, arm itself. A typical sequence is for the system sense ignition on-to-off, followed by sense door open then close, wait 30 seconds, and if no triggers are active during the 30 seconds, then arm the system. A disadvantage of the prior art is if the driver leaves a door open, or a trigger malfunctions, e.g. a door sensor, or a false sensing of trunk open, or a false vibration sensor, then the passive feature will not arm the system. This leaves the automobile and its contents unprotected and vulnerable to theft.

The present invention, to improve passive arming, and overcome the shortcomings of the prior art, provided a sequence for arming the system a predetermined time period, e.g. 5, or 10 minutes, after the ignition is turned off.

An object of the invention is to provide an improved passive arming system and method.

Another object of the invention is to provide an improved passive arming system and method which overcomes faulty sensors, and compensates for drivers who do not manually arm the system when leaving the automobile and leave a door open.

Another aspect of the present invention is an improved manual override which provides convenience to the driver and enhanced theft protection for the automobile.

A manual override usually supplements the traditional valet feature. The valet switch, which is usually a toggle switch inside the automobile and operated by the driver, is intended for use when a person gives the automobile keys, but not the alarm system transmitter, to an attendant to park the car. Thus, when the attendant is parking the car, the alarm is completely deactivated, including any passive arming which may be in the system.

At least one prior art patent '867 shows an override switch in addition to the valet switch. In order to operate either of them, the ignition must be on (the valet switch is operable only when the system is in the disarmed condition) and the override switch is operable only when the system is in the armed condition. A typical use of the override switch is when a person has the key to the automobile but cannot find the transmitter, or the transmitter does not function due, perhaps, to a low-charged battery. The owner enters the automobile with his key, which triggers the system. The owner then turns on the ignition, the alarm is sounding, and then activates the override switch, which disarms the system, and the alarm stops.

A problem of override which the present invention addresses is that of a thief. In the present invention there are separate switches for valet and override. The valet switch operates in the usual fashion. That is to say, it can only be operated when the system is disarmed and the ignition is on. The override is operated when the system is armed and has been triggered, e.g., the owner has forgotten his transmitter and has entered the automobile with his key, and the alarm is sounding. The owner then activates the override switch, and the alarms keep sounding. Activation of the override switch sets off a timer, e.g. of 30 seconds duration. If during this time period, the owner turns the ignition on, then the alarm system is disarmed and the sirens stop. If the ignition is turned on after this time period, then the system remains on, and triggered, with the alarm sounding. The 30-second timer is a convenient time duration. It should be noted that 30-seconds is typical if the overdrive switch is in the trunk. If the manual overdrive is in the passenger area, close to the driver's seat, then 5 seconds would be typical. It should be understood that although the application refers to 30-second timer, it may be of longer or of shorter duration.

In a situation involving an attempted theft, if the thief should force entry of the automobile door when the automobile is armed, the system will be triggered and the siren will sound. At this moment the thief has only 30 seconds in which both (1) to locate and operate the override switch, and (2) to jump the ignition. Experience has shown that most thieves, upon generating a automobile alarm, will abandon further attempts to steal the automobile if they cannot quickly and easily deactivate the alarm.

Thus, another object of the invention is to provide an alarm system with separate valet and override switches; and which enhances protection of the automobile.

Another aspect of the invention is an improved portable transmitter and command control to increase the number of functions which can be operated from the remote control transmitter.

In the prior art, to increase the number of functions which can be operated from the transmitter, there have been two solutions. One has been to increase the number of buttons on the transmitter, each button operating a different function. Another approach is store and transmit. The latter solution is best explained by an example. With two buttons on the transmitter, the user would depress, for example, one button three times, and then depress the second or send button. For a different function, he might depress the first button four times, and then depress the send button. The receiver and controller decodes the signal. The two prior art techniques require different types of transmitters, are complicated to operate, and in some instances can become quite confusing without an instruction manual or without instructions written on the back of the transmitter.

The shortcomings of the prior art are overcome in the present invention by using a conventional transmitter which has two buttons and three channels. In the receiver, according to the invention, the incoming signal on channels 2 and 3 may be used to perform two functions each, depending on whether or not the vehicle is armed or disarmed. For example, if the system is in the armed state, and a signal is sent on channel 2, then the microcontroller will first determine if the system is armed, and, if so, will then perform the preprogrammed instruction. If a signal is sent on channel 2 while the system is disarmed, the microprocessor will sense the disarmed state, and then send the appropriate command signal.

Other functions may be performed by using channel 3, i.e., the simultaneous depressions of buttons 1 and 2. For example, if the system is in the armed state, and a signal is sent on channel 3, then the function might be to turn on the headlights, and, if in the disarmed position, to lower the windows. The instructions from the transmitter may be operated both internally and externally, i.e., while the person with the transmitter is either in the automobile or outside of the car.

Thus a further object of the invention is to provide a split channel feature, in which the number of different commands that can be executed from the transmitter is increased.

A still further object is to increase the number of such commands with a conventional two button transmitter.

A BRIEF DESCRIPTION OF THE DRAWINGS

FIGS. 8a and 8b are flow charts showing another embodiment of a split channel embodiment of the invention.

DETAILED DESCRIPTION OF THE PREFERRED EMBODIMENTS

Figure 1:
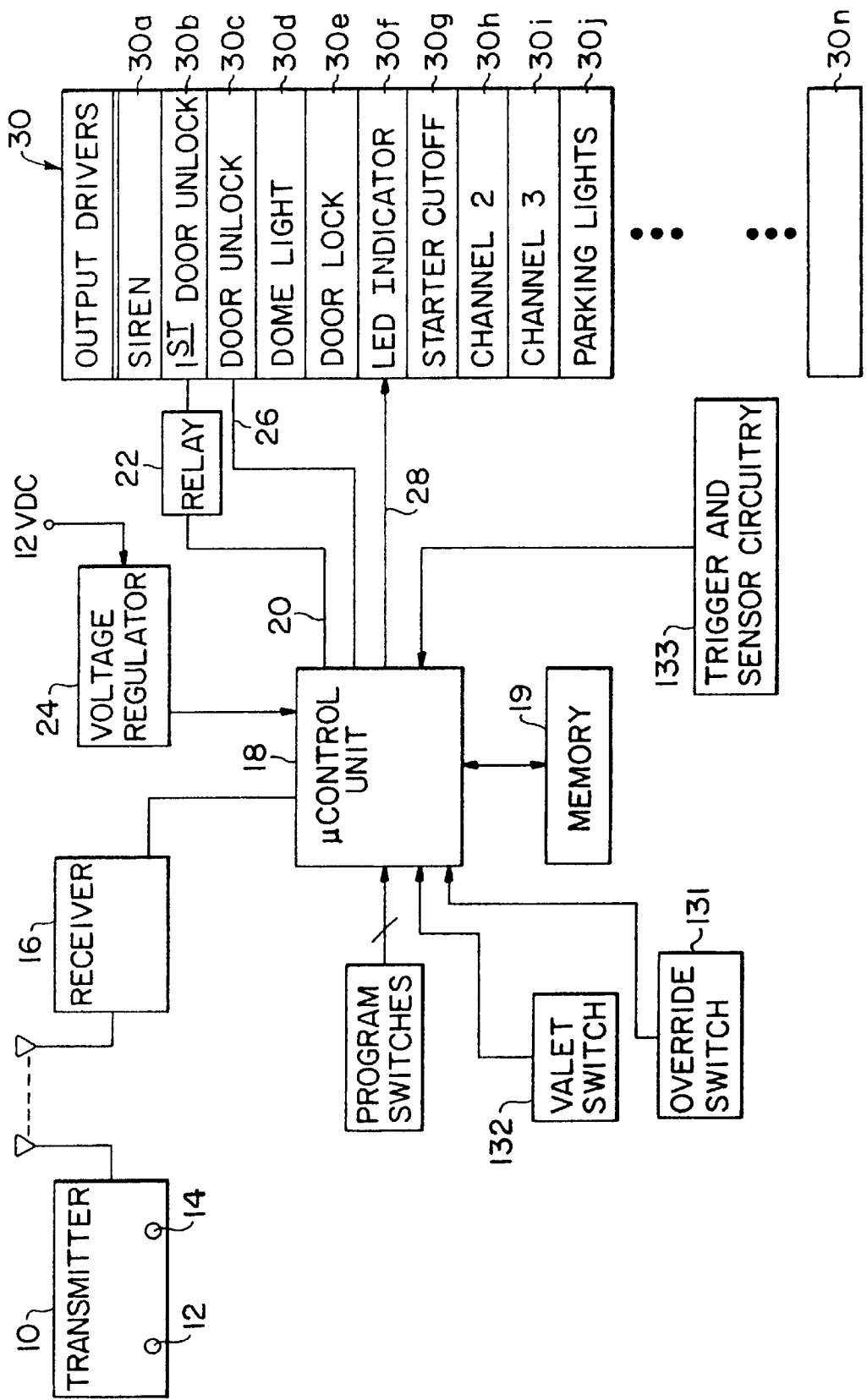
FIG. 1 is a schematic block diagram of an alarm system for an automobile showing certain embodiments of the invention.

FIG. 1 is a schematic block diagram of aspects of a basic alarm system and aspects of the present invention. A transmitter 10, which is typically held by the user has a pair of operator operated buttons 12 and 14. Activation of a first button, e.g. button 12, produces a pulse code modulated signal, e.g. of 16 bits in the 275–310 MH range. Activation of the second button 14 produces a different PCM signal which, for example, is also 16 bits; and simultaneous activation of both buttons 12 and 14 produces a third and different PCM signal, also for example of 12 bits. Presently the PCM signal is 16 bits, but other length signal, and coding may be used.

Inside the automobile is a receiver 16 which may be any convenient or conventional receiver, of the kind which receives the signal from transmitter 10, amplifies the signal, demodulates, and passes the signal to a microcontroller unit 18.

The microcontroller unit 18 receives the incoming signal from receiver 16 and compares or verifies the coded signal with a code stored in a memory 19, which may be an E²PROM (not shown) in the microcontroller. If the code is verified, then an output signal is provided on an output terminal and lead 20 of the microcontroller. This output signal is typically a pulse of sufficient duration and amplitude to operate a relay 22 which is shown in the drawings between the microcontroller unit 18 and a first door or driver's door unlock control 30b. The relay 22 is shown external to the microcontroller unit, although it may actually be on the same circuit board as the microcontroller unit circuit board, or part of the microcontroller unit 18.

A 12-volt DC power source (not shown), which may be the automobile battery, supplies power to a voltage regulator 24 which is connected to and powers the microcontroller unit 18, and the relay 22. The output signal from the microcontoller unit 18 on lead 20 activates relay 22 which then controls the driver's doorlock. The door unlock mechanism is conventional.

When the transmitter is twice activated within a short period of time, e.g. within 5 seconds, the second signal is used to unlock all the doors in the automobile. Here, activation of button 12 produces the same signal that was previously transmitted from transmitter 10 to receiver 16 where it flows through to the microcontroller unit. Time delay measurements are carried out in the microcontroller unit, and if the second signal is received within a predetermined time, e.g. a 5 second period, then a signal goes out from the unit 18 on a lead 26 to a door lock/unlock control 30c to unlock all the doors in the automobile.

In practical embodiments, the microcontroller unit 18 will have a plurality of outputs, which drive or control a plurality of output drivers 30 and 30a . . . 30n. Output from control unit 18 are transmitted to the output drivers 30 over a plurality of leads which are typically a wiring harness, shown here with legend 28. The lead 26 is included within the plurality of leads 28. Each of the leads 28 extends to the appropriate driver 30.

An activation of the button 12 after the predetermined time period, e.g. after the 5 second time interval, causes the microcontroller unit 18 to generate a series of control signals or pulses at its outputs and over conductors 28. These include lock all the doors, at output 30e; and arm the system (internal to unit 18). Arming the system causes a flash of the automobile parking lights, on output 30j, a single chirp at output 30a, and the status indicator e.g., a flashing red LED at output 30f visible inside the car. Additionally, arming of the system causes the starter to be cut off, output 30g, and if the interior automobile light is on, to turn it off, output 30d. This is shown schematically in the drawing as being sent to the output drivers 30 and 30a–30n via the bus 28.

The 5 second time delay between the first and second signal has been found to define a convenient and practical time window. However, longer or shorter time periods may be used e.g. in the range of 2.5 to 12.5 seconds.

Figure 2:
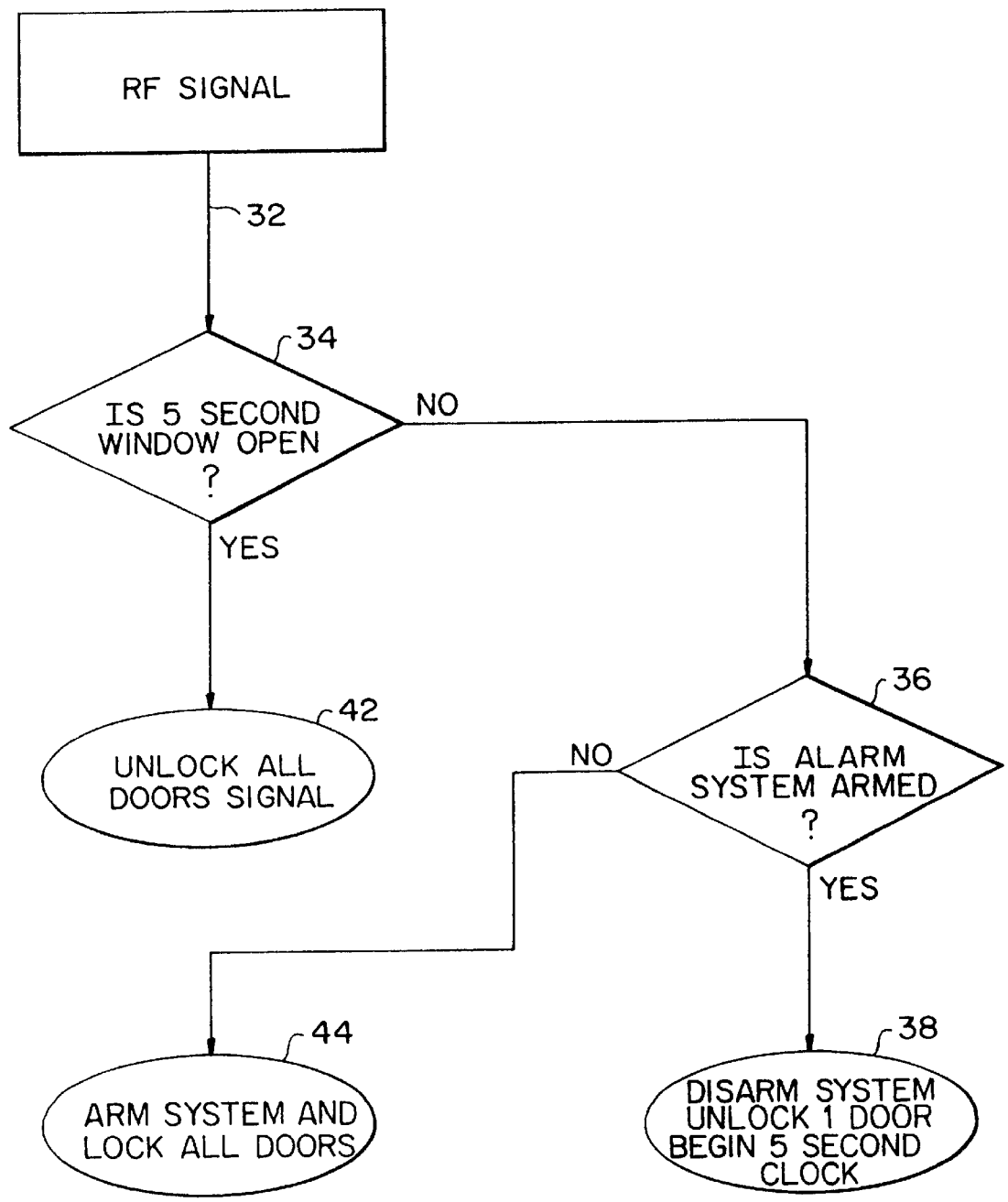
FIG. 2 is a logic diagram of operation of one embodiment showing a two step door unlock feature.

FIG. 2 is a logic diagram, or flowchart, illustrating some of the functions performed by the microcontroller unit 18 in accordance with the first embodiment. After the signal from the transmitter 10 is received and compared with the codes in memory 19, microcontroller unit 18 generates an internal signal at 32 to a decision box 34. Here, a decision is to be made is the unit in the 5 second time window, i.e. was a signal previously received within 5 seconds? If the system is not in the 5 second window, then it proceeds as shown in the flowchart to the next decision box 36 and the interrogation "Is the system armed?" If the system is armed, then three instructions are given as shown at command output box 38, first, a disarm command (internal to unit 18), second, unlock one door command (output on lead 20 to relay 22 to unlock one door at 30b), and third begin 5 second window command (internal to unit 18).

Alternatively, if the signal arrives on 32 while the 5 second window is open, then a decision is made in 34 and control signals are set to unlock all the doors 42.

The third possibility is if the signal 32 comes in, to decision block 34 and the 5 second window is not open, and the system is not armed 36, then the microprocessor issues two command instructions 44, to lock all doors (control signal to output driver 30e), and to arm the system (internal to unit 18).

It will be appreciated any convenient or conventional microprocessor unit 18 may be employed and programmed in accordance with the logic flow chart in FIG. 2 and the subsequent flow charts. Alternatively, a dedicated circuit with gates, clocks, and decision circuits may be used. The choice between a microprocessor programmed and a dedicated circuit is a matter of economics depending upon the anticipated or actual quantity of units and systems to be manufactured. For large production runs, the dedicated I.C. circuit would appear advantageous. It should be understood however that the invention is not limited to a particular embodiment, as economic, engineering and technical conditions will dictate the choice.

Figure 3:
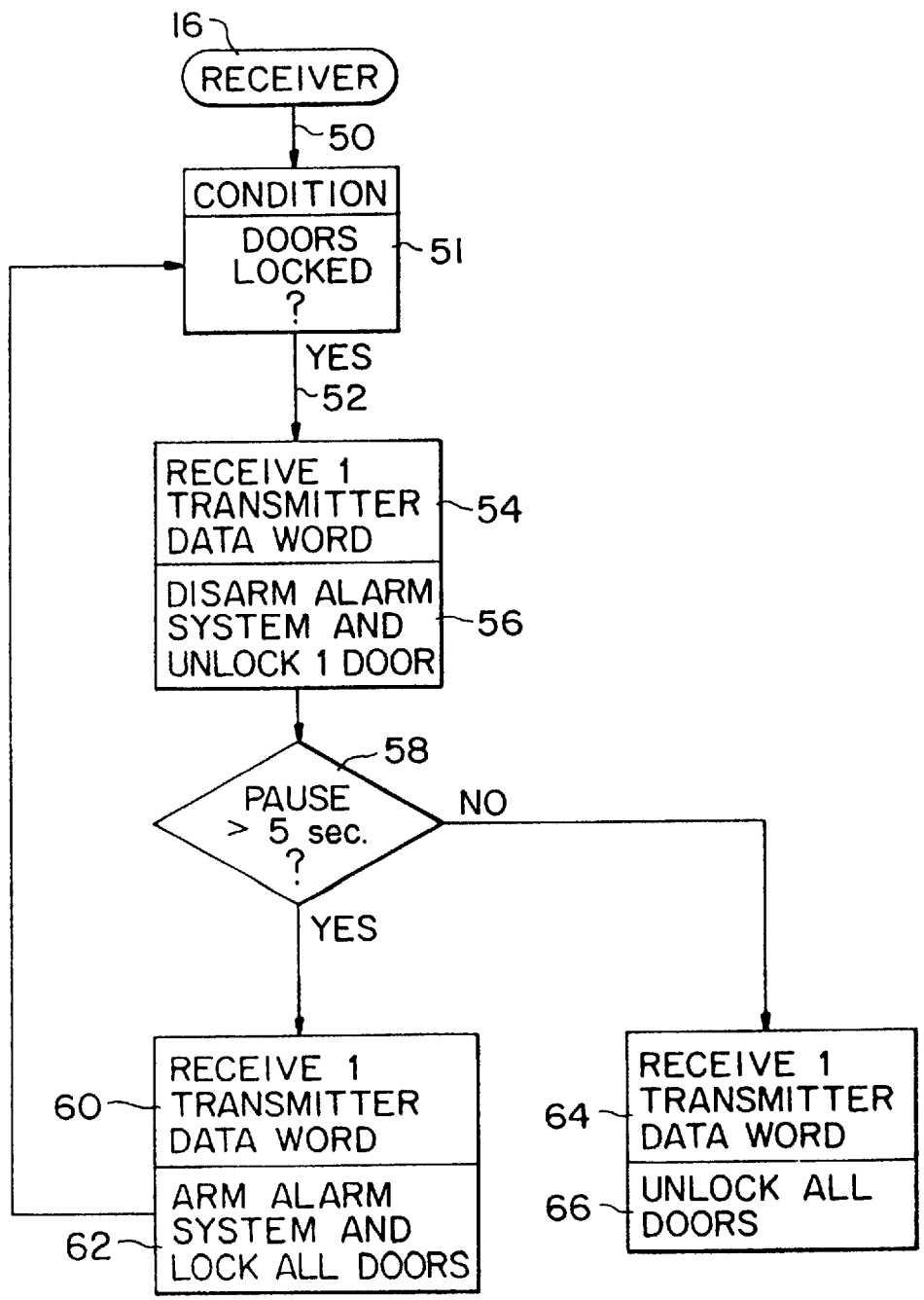
FIG. 3 is a block diagram of operation of the embodiment of FIG. 2.

FIG. 3 is another flow chart of operation of part of the first embodiment.

A signal from the receiver 16 is fed to the microcontroller where it is compared with the memory, and if the code matches then a signal goes as shown in FIG. 3 on line 50 to a functional decision box 51 which asks as to the conditions of the doors. If the doors are locked, when the system receives the first transmitted data word from the transmitter, as shown in FIG. 3 in block 54, then the results are as indicated in block 56, namely, to disarm the system and unlock one door. A decision is then made to pause for 5 seconds. This opens a 5 second time window, as shown in decision box 58. If after the 5 second time window another transmitted data word is received as shown in box 60, then the consequences follow as shown in box 62, i.e. to arm the system and to lock all of the doors. If the transmitted data word is received within the 5 second pause, i.e. when the time window is open, as shown in block 64, then, all of the doors are unlocked as shown in block 66.

Figure 4:
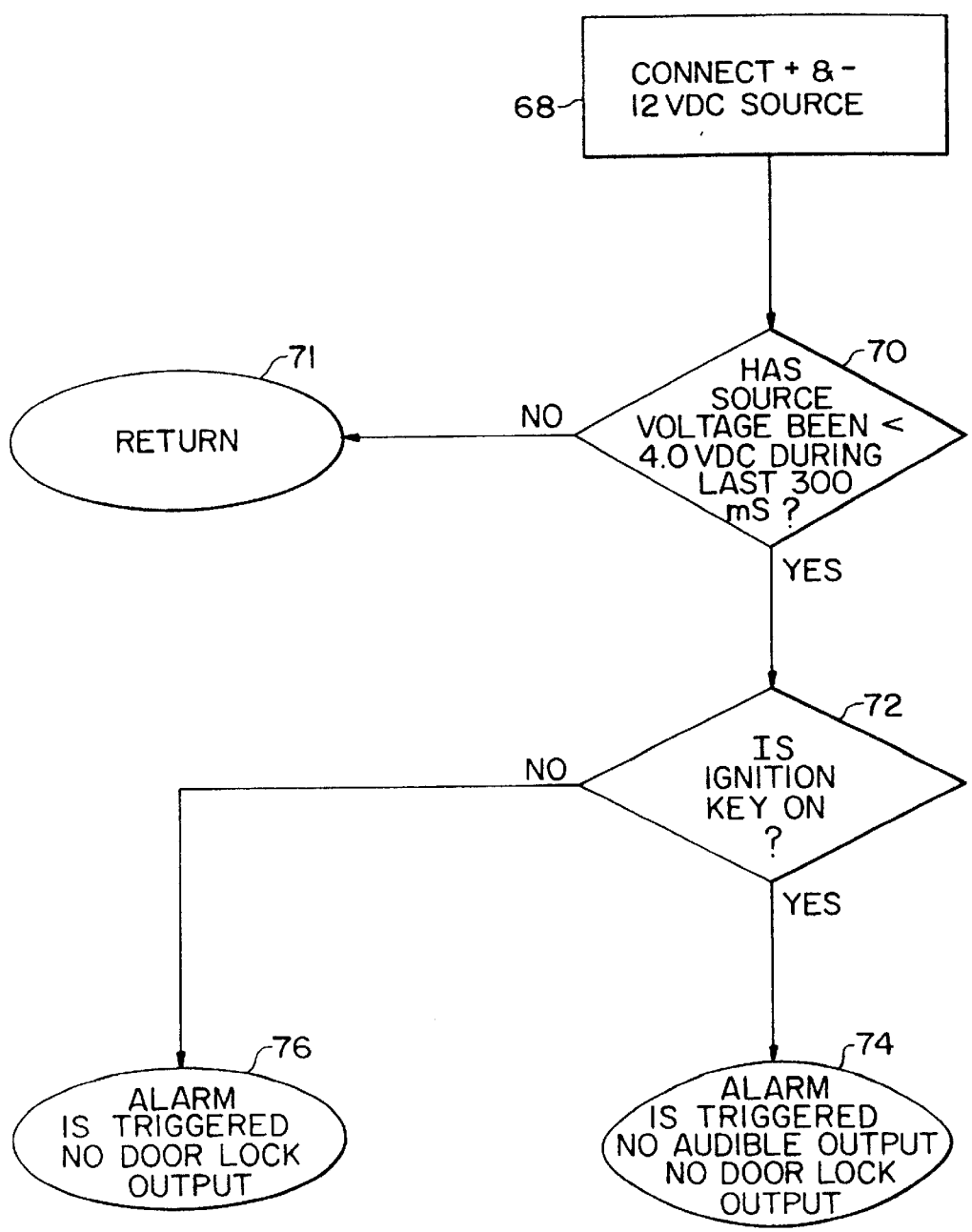
FIG. 4 is a flow chart of an alternative embodiment showing smarter power up feature.

FIG. 4 is a flow chart of a smarter power-up embodiment of the invention. This feature is directed to system installation, battery reconnection, and anti-theft. During an installation of alarm systems in the field, i.e. after the automobile has been manufactured, the installer usually first disconnects the automobile battery, then installs the alarm system, and lastly reconnects the battery. In prior art systems when the battery is reconnected, the system came on armed, locks all the doors, and activates the siren. The installer often finds at that time, that the keys are in the ignition, the doors are locked, and the siren is going off. In a garage (or in any close quarters where there are workers) the siren is not only disturbing, but may be a safety hazard. The keys needed to turn off the system are locked in the car.

As shown in FIG. 4., when the automobile battery is first connected or reconnected at 68 the system comes on armed and a signal goes to the controller 18, and a decision is made therein as to whether the battery or source voltage been less than 4 volts DC during an immediately preceding short period of time, e.g., 300 milliseconds as shown by decision box 70. If the response to this inquiry is "no", then the system returns to whatever condition existed before the power interruption and ignores the rest of the functions as shown at return oval 71 in FIG. 4.

If the response to the inquiry is "yes", then there is a second logical determination at logic box 72 to be made of whether the ignition switch is "on". If there was an attempt to steal the car, then the ignition key may be sensed as "on", and then three commands are given as shown by command box 74: (a) the system is triggered, (b) there is no audible output, and (c) no door lock output. If the ignition key is not "on" then the alarm is triggered as shown at out put 76.

Figure 5:
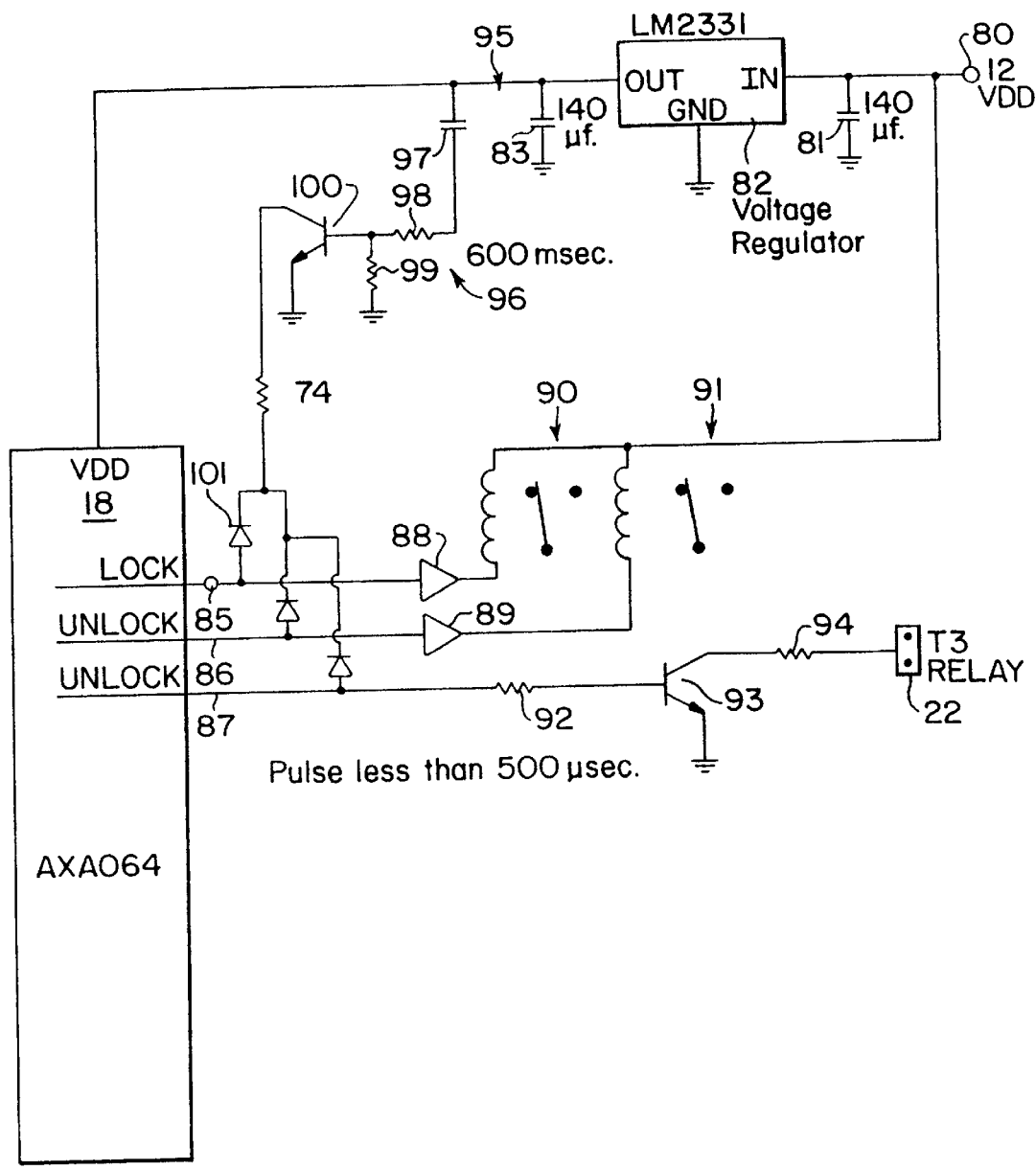
FIG. 5 is a schematic diagram of an alternative embodiment for not activating door locks upon initial turning on of the power.

FIG. 5 is a schematic diagram of an alternative embodiment for inactivating the door lock command upon connection of the battery. The battery is shown at terminal 80 with legend VDD. A smoothing capacitor 81, a voltage regulator 82, and a third smoothing capacitor 83 are connected in parallel between the battery and ground.

The output from the smoothing capacitor 83 goes to the alarm system microprocessor 18 at input VDD'. The microprocessor 18 has a plurality of outputs, only three of which are shown, i.e., a lock all doors 85, and unlock one door 86, and unlock all doors 87. A specific example of the signal to activate the lock/unlock outputs is a positive pulse with a duration of about 500 milliseconds. The lock all and unlock one door output pulses go to amplifiers 88, 89, respectively, and then to windings of two door lock relays, shown schematically at 90 and 91. The unlock all doors output 87 is connected to relay 22 through an amplifier and buffer circuit of a first resistor 92 a transistor 93 and second resistor 94. Any convenient or conventional amplifiers and relays may be used.

Interconnected between the microcontrol unit three outputs 85, 86, 87, and the output of the smoothing power supply 81, 82, 83, is a time delay circuit 96. The overall operation of the circuit 96 is to connect to ground for a short period of time, e.g., 600 milliseconds, and during that time when the 500 millisecond control pulse would be coming out on the outputs 85, 86, 87, so that those outputs are shunted to ground, thereby disabling any control signals being sent to the door lock relays 22, 90, 91. The time delay circuit 96 includes a timing RC circuit of a capacitor 97 and two resistors 98 and 99, connected in series with an output between the pair of resistors, which feeds into the base of a transistor 100 having its emitter grounded and its collector connected to each of the outputs 85, 86, 87 of the unit 18. Three forward biased diodes 101 connect the outputs 85–87 to the collector of transistor 100. A shunt resistor 102 is included between the diodes 101 and the collector. When power first comes on at VDD, transistor 100 initially turns on, thereby bringing the collector to ground, and also each of the three outputs 85, 86, 87 through the forward biased diodes 101 to ground. The voltage slowly rises at the base due to the time circuit, and after approximately 600 milliseconds the transistor 100 is turned off.

The circuit of FIG. 5 may be external to the control unit 18. For example, it could be added in the field to an existing alarm system. Alternatively, the function performed by FIG. 5 may be internal to the control system microprocessor. Its function may be performed with the circuitry as shown, with any convenient or conventional circuitry, or, if a microprocessor is used, the time delay could be software programmed therein.

Figure 6:
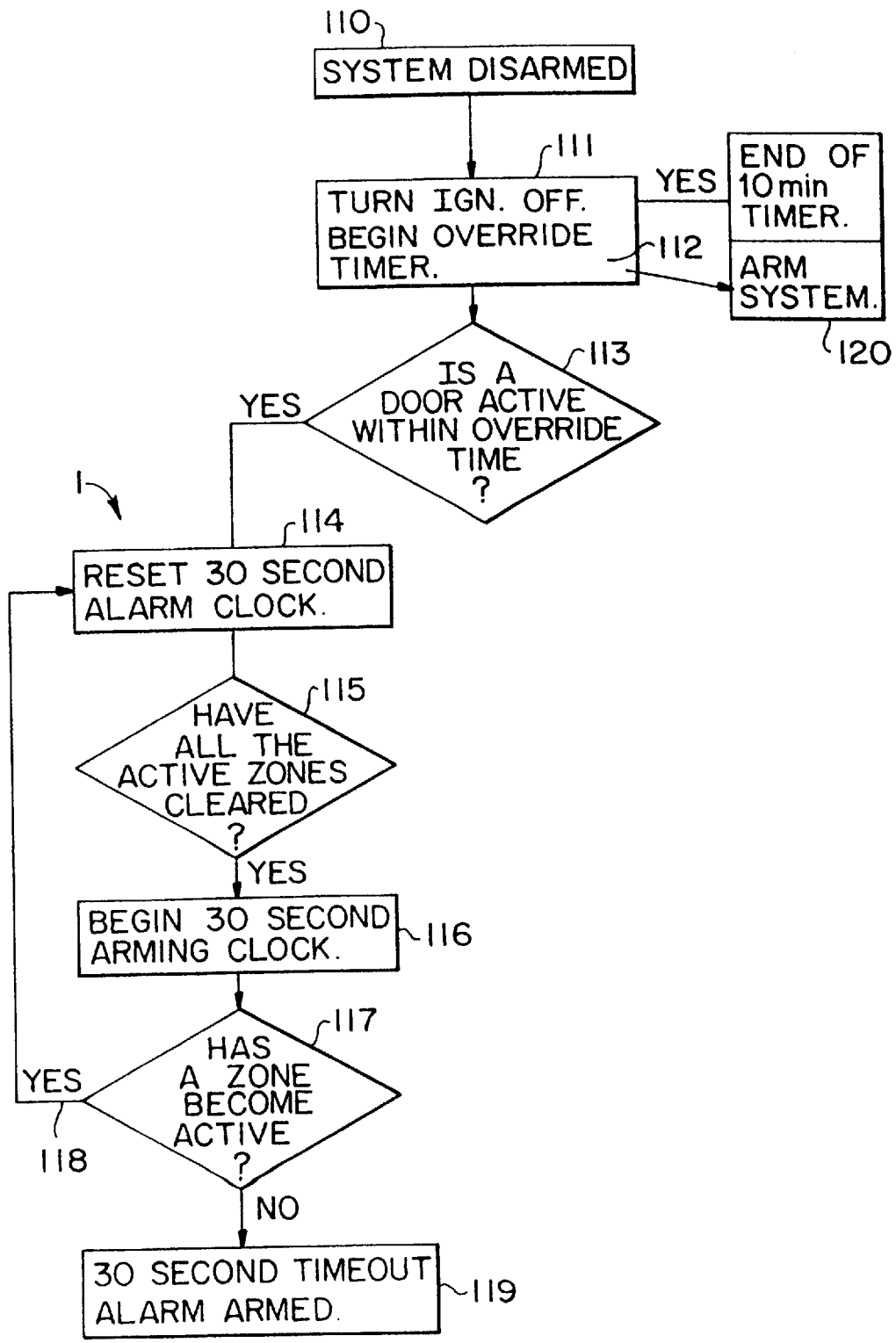
FIG. 6 is a flow chart of another embodiment of the invention for improved passive arming of the alarm system.

FIG. 6 is a flow chart illustrating passive arming with override of defective zone e.g. open door or defective trigger condition, e.g., defective sensor.

Some prior art automobile security systems may include a passive arming feature. This typically arms the system when the automobile is parked and (1) the ignition is turned off, (2) at least one door is opened and (3) subsequently all the doors are closed. After those three conditions are sensed, the system initiates a time delay typically 30 seconds from the close of all doors, and at the end thereof the system arms itself. It should be noted that, in the prior systems, if a door is opened within the 30-second time delay, then the system does not arm but waits to sense the closing of all doors, and then initiates another 30-second time delay before arming. Also the prior art systems would not arm, in a passive arming mode, if they sensed that any of the triggers were active. For example, if a door was left open, or a faulty vibration sensor, which gives a false signal sensing vibration, or a faulty door sensor indicating an open door.

The present invention has an improved passive arming system and adds to the system a second timing sequence. Once the ignition is turned off, a long time delay is initiated, e.g., 10 minutes, and at the end of that time the system is armed regardless of any trigger conditions. For example, the system is armed even if a door is left open, or if one of the triggers is active, e.g., a faulty vibration sensor or faulty door sensor. Further, if there is a defective sensor, on the driver's door, the prior art 30-second timing will not be activated, because it would not sense the opening of the door. In the improved invention, the 10 minute arming will take place, and the defect will be flagged until cleared.

FIG. 6 is a flow chart of the sequence implemented in the control unit 18 for carrying out this new function. Starting at the top of the chart, shows the system is in a state of disarmed 110, e.g., the automobile is being driven. Next the automobile is stopped, and the ignition is turned off. The ignition off is sensed 111 and this begins the 10-minute override timer 112. A decision is then made in decision box 113 whether there is sensed a door active, i.e. open within the 10-minute override period. This corresponds usually to the driver leaving the automobile. If a door opened signal is received within the 10-minute time period (and here we are following down the left-hand side of the flow chart), a short, 30-second timer 114 is put in a ready state, but does not begin counting the 30 seconds. The system then waits for a second input 115 of the closing of all the doors, and also checks that there is no triggers active. An example here is that a person exits the car, opens the door, closes the door, and there is a malfunctioning sensor, e.g., motion sensor. In this case the system would not arm in the 30 second interval during such a condition. Or, as a second example, a person turns off the ignition, opens the door, leaves the automobile and doesn't close the door, or the sensor on the door is defective. Here the system would not arm.

After all the active zones have cleared in decision box 115, then the 30-second arming clock 116 begins its 30-second count. If, during this 30-second period a zone becomes active 117, e.g., the driver reopens the door, then the 30-second clock 116 is stopped and placed in a reset and ready state via lead 118. For example, the driver during the 30 seconds after closing the door 115, goes to the trunk and opens it, then the 30 second timer will begin its count again once the trunk is sensed as being closed. Again if the driver during this second 30 second time open e.g. the back door, then the timer would be reset, and begin its count when the back door was sensed as being shut. If no sensor becomes active within any 30-second period, then at the end of the 30-second period the system becomes armed 119.

The passive alarm will arm the system 120 at the end of 10 minutes following a disarmed system 110, sensing the ignition being turned off 111.

An alternative passive alarm system is to arm the system at the end of 10 minutes following the system going from armed to disarmed and the ignition remaining off. E.g, if the owner goes to the car, disarms the system, to e.g. get something from the trunk, and then forgets to close the trunk. The passive rearm will rearm the system after 10 minutes from the system being disarmed, and no ignition on is sensed.

The 10 minute time interval has been found to be a convenient time period, as has the 30 second period. Other periods e.g. 5 to 15 minutes, and 15 to 60 seconds may be used without departing from the teaching, scope and spirit of the invention.

Figure 7:
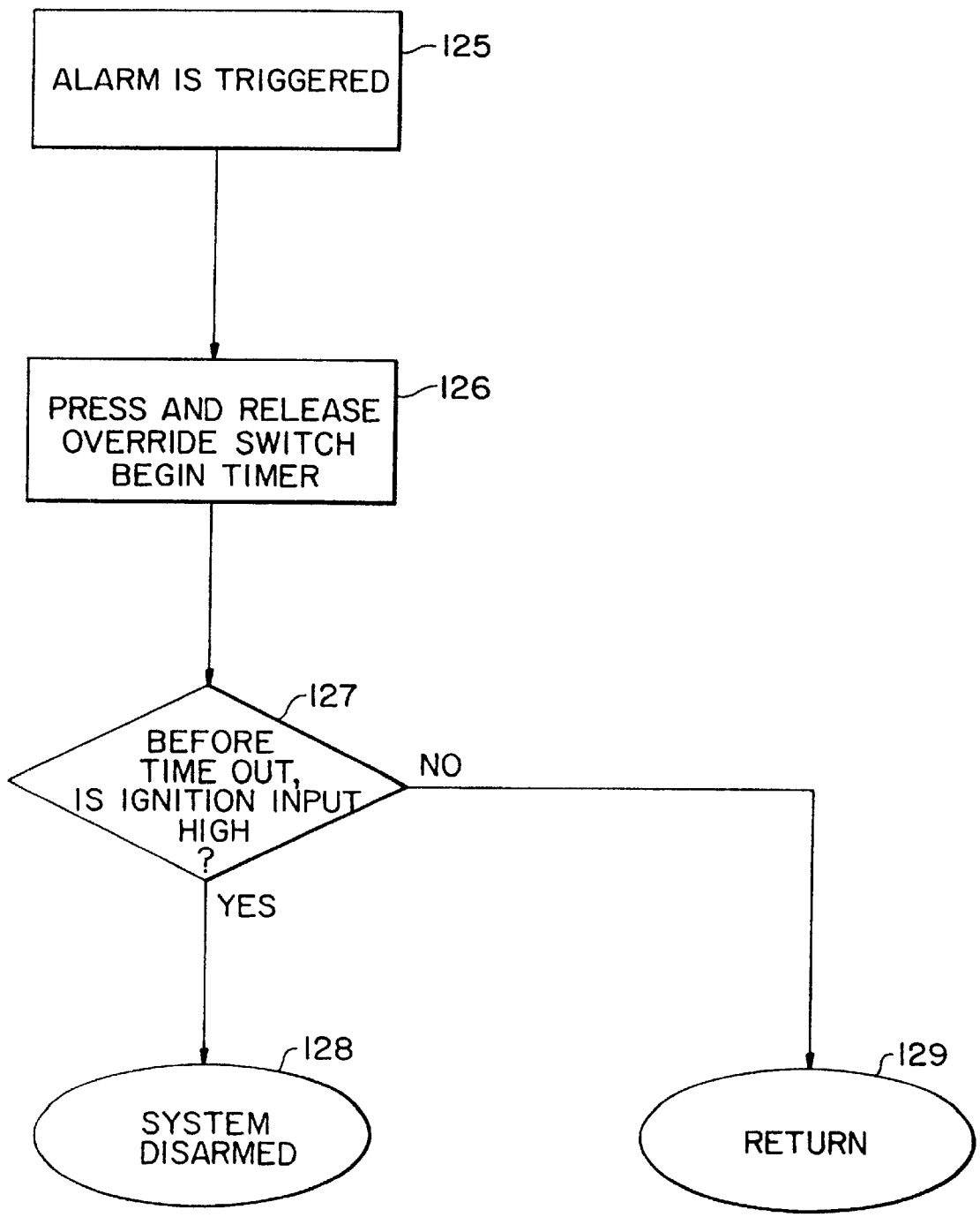
FIG. 7 is a flow chart of a further embodiment showing a manual override, according to a further aspect of the invention.

FIG. 7 is a flow chart showing a manual override embodiment of the invention which may supplement the traditional valet feature. Heretofore, automobile alarm systems have been provided with a valet switch and sometimes with an override switch, which may be one or two toggle switches inside the vehicle. These switches may be activated at any time the ignition is on, and are used to deactivate the system. The valet switch is intended for use when a person gives the automobile keys, but not the alarm system transmitter, to an attendant to park the car. Thus, when the attendant is parking the car, the alarm is completely deactivated, including any passive arming which may be in the system.

At least one prior art patent '867 shows an override switch in addition to the valet switch. In order to operate either of them, the ignition switch must be on. The valet switch is operable only when the alarm system is in the disarmed condition. The override switch is operable only when the alarm system is in the armed condition, and only when the ignition is on. A typical use of the override switch is when a person has the key to the automobile but cannot find the transmitter, or the transmitter does not function due, perhaps, to a low-charged battery. The owner enters the automobile with his key, which precipitates the alarm to go off. The owner turns on the ignition, while the alarm is sounding, and then activates the override switch, which disarms or turns off the alarm system.

A problem which the present invention addresses is that of a thief, and it provides a novel system directed at override. In the present invention there are separate switches for valet and override. The valet switch operates in the usual fashion. That is to say, it can only be operated when the system is disarmed and the ignition is on. The valet toggle switch then maintains the system in the disarmed state and will not permit the system to become passively armed.

The override is operated when the system is armed and has been triggered, e.g., the owner has forgotten his transmitter and has entered the automobile with his key. The alarm is now sounding. The owner then activates the override switch, and the alarms keep sounding. Activation of the override switch sets off a timer, e.g. of 30 seconds. The time duration is any convenient time, and 30 seconds is typical, longer or shorter may be used. If during this time period, the owner turns the ignition on, then the alarm system is disarmed and the sirens stop. If the ignition is turned on after the 30 seconds, then the system remains on, and triggered, with the alarm sounding.

In the situation involving an attempted theft, if the thief should force entry of the automobile door when the automobile is armed, the system will be triggered and the siren will sound. At this point, while the alarm is sounding, the thief must locate and operate the override switch, and then has only the few seconds from the timer, to jump the ignition switch. Experience has shown that most thieves, upon generating a automobile alarm, will abandon further attempts to steal the automobile if they cannot quickly and easily deactivate the alarm. Triggering of the system will usually also disconnect the starter, interrupt the ignition, flash lights, sound horns, sirens, etc.

FIG. 7, a flow chart, shows the operation of the manual override feature. Status sensor of the alarm being triggered is indicated at status box 125. An operator operates an override switch at 126. An override switch typically is a depress switch, which returns to its initial position. This operation of the switch begins a timer, which for example has a 30 second time duration. The timer is any convenient or conventional timer, and typically is included within the controller 18. During the 30 second time duration, the controller waits to receive a signal that the ignition has been turned on, as indicated in decision box 127. If the ignition is turned on within the 30 second time period, then the system is disarmed as shown at control 128. If the ignition is not turned on within the 30 second time interval, then the system remains in the triggered condition, as indicated in decision box 129.

The override switch is shown in FIG. 1, with legend 131 and provides an input to the microcontrol unit 18. The switch is typically a depress switch which would send a single pulse to the microcontrol unit, although any convenient or conventional switch may be used. The switch is physically located within the car, and is usually placed at a position known only to the driver. This is usual for the location of the override switch, as is the location for a valet switch 132. The sensing of the ignition being on, comes from the plurality of input circuits which are shown in FIG. 1 as trigger and sensor circuitry 133.

Figure 8B:
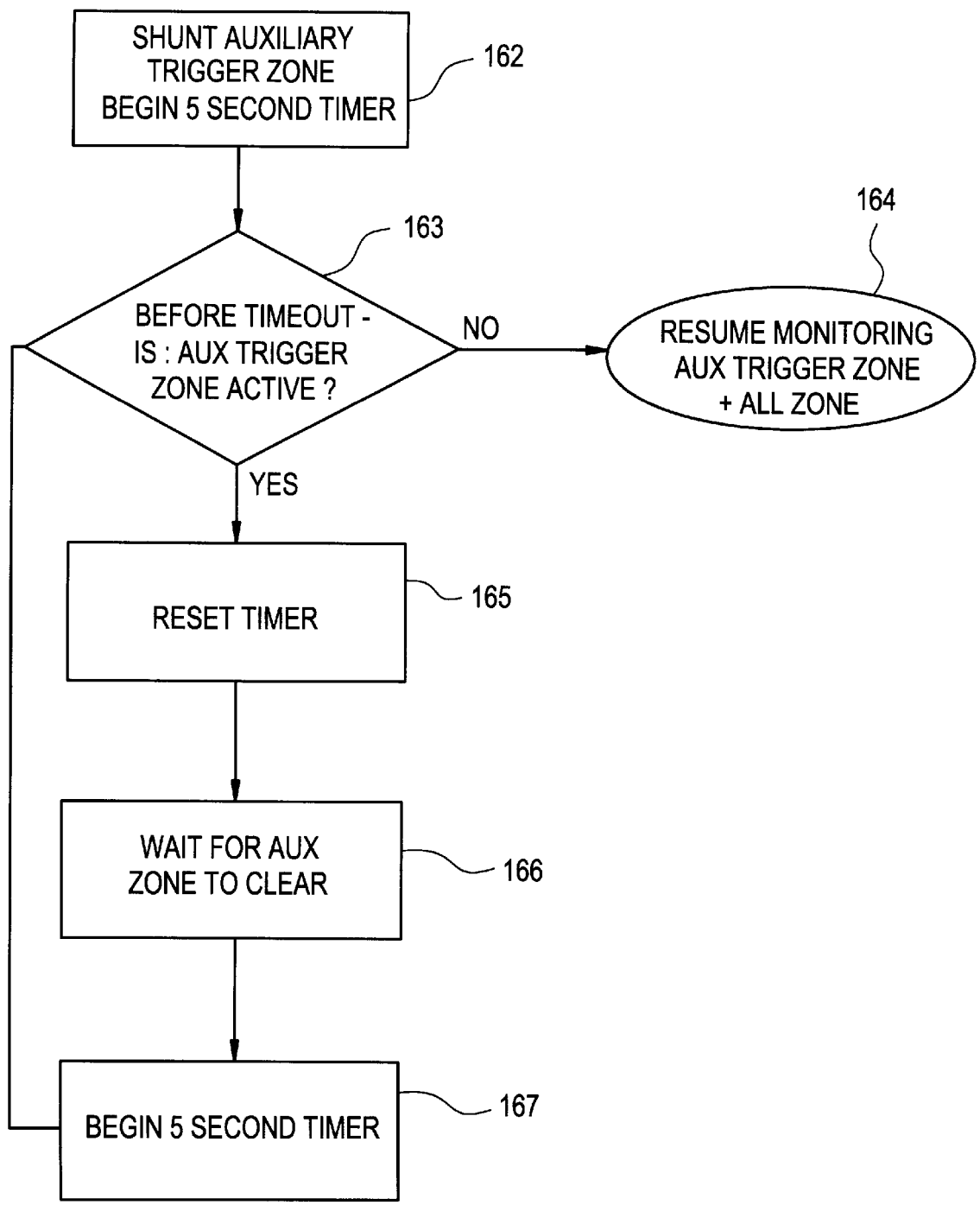

FIGS. 8(a) and 8(b) are flowcharts showing a split channel feature, which increases the number of functions, which can be provided from a two-button transmitter 10 without increasing the number of channels in the transmitter 10 and the receiver 16, and without increasing the number of output terminals in the microcontroller 18.

The transmitter 10 has two user activated buttons 12 and 14. Operation of button 12 is usually used to arm and disarm the system. Operation of button 14, and a simultaneous operation of buttons 12 and 14 will operate up to four different functions in the system. For example, operation of button 14 when the system is armed, may be used to cause the automobile lights to flash; and when the system is disarmed, to release the trunk. Simultaneous operation of buttons 12 and 14 when the system is armed might be used to sound the horn or a siren, and when the system is disarmed to turn on the ignition, i.e. to be a remote start of the automobile.

Operation of the buttons in the transmitter 10 sends out a signal always on the same carrier, but different buttons transmit different bit information codes which are then decoded by the receiver 16. Alternatively, each button, or button combination may operate on a different carrier.

In the above example, button 12 is used to arm and disarm. The remaining channels typically are used for such functions as trunk release, window roll-up, remote start, horn sound, siren sound, flash lights.

The present system in one embodiment by using the two button transmitter for up to six different commands beeps and simplifies the transmitter and the receiver as well as the cost of overall manufacture and retrofit of the system into older models.

FIG. 8(a) and FIG. 8(b) are flow charts showing sequence in the microcontroller 18 for implementing this function. With reference to FIG. 8(a) a signal is received and decoded. If it is the signal from button 10 to arm and disarm, the function is carried out. If not for arm or disarm, the signal is then passed to an auxiliary decoder 150, which then decodes it. A signal is generated from box 150 and goes to a decision box 151 which asks "is the system armed?" If no, then the function is performed. For example, if the button 14 has been depressed, and the command programmed for button 14, when the system is disarmed, is to open the trunk then the function to be performed is to open the trunk.

Similarly, for an incoming signal, from a simultaneous operation of buttons 12 and 14, arriving at box 150 is decoded. A new signal then goes to decision box 151, and asks "is the sytem armed?" If no, then the function, preprogrammed for button 12 and 14 simultaneous operation and the sytem disarmed, is then performed, via a control signal output 152.

If the command coming in from box 150 to decision box 151 finds that the system is armed, at decision box 151, then a shunt subroutine is initiated 152, and shown in detail in FIG. 8(b). The command is then carried out, and if the carrying out of that command will trigger the armed system, then the trigger zone is shunted for a period of 5 seconds, as shown by command box 162. A decision is then made within the 5 second window, before time out, is the auxiliary trigger zone active. If no, then resume monitoring of the auxiliary trigger zone at 164. It is noted, that all other trigger zones are being monitored. If the shunted trigger zone is active, then the timer is reset at box 165. The system then waits for the auxiliary zone to clear, e.g. as shown in decision box 166. Upon clearing, a 5 second timer is begun again as shown in 167, which is fed back to decision box 163, and here the answer to decision would be the auxiliary trigger zone is not active, and that would resume monitoring of the auxiliary trigger zone at 164.

The microcontroller memory, is shown as unit 19. This typically is an $E^2PROM$. The memory typically stores four codes per channel. For example, one channel is when button 12 is activated, a second channel when button 14 is activated, and a third channel when buttons 12 and 14 are simultaneously operated. This is to permit on each channel four different transmitters, and four transmitters per system. The microprocessor may be programmed such that one of the codes will give full access to the vehicle. All other codes will have limited access to the vehicle, e.g. access to the trunk or no access to the trunk. In the illustration, there are three channels per transmitter, and four transmitters per system each with different codes, for four codes per channel, and thus there would be a total of 12 possible codes. The three channels may have three different frequencies and PCM, or may have the same frequency with different PCM codes.

There has been shown and described several embodiments of the invention, all of which are improvements in automobile security alarm systems. It will be understood that the various embodiments may be used separately or in combination in an alarm system, both in systems newly manufactured and in retrofitting existing systems, and in additions to existing systems. The goals of the invention are to make theft more difficult, provide ease of use to the automobile owner, and better security to the owner, both approaching his automobile to use it, and when the automobile is parked in a dangerous area. Other goals which are sought are ease of manufacture, consistency with existing equipment, simplicity and the economies that result therefrom.

Although the invention has been described with reference to an automobile, it should be understood that the alarm is applicable also to other vehicles such as, but not limited to, trucks, travel trailers, recreational vehicles, motor homes, boats, and in the marine industry.

Reference is now made to the appended claims for the scope of the protection of the invention.

We claim:

1. A vehicle security system having a settable armed state and a settable disarmed state, said vehicle including an ignition having an on state and an off state and a switch that initiates passive arming of the vehicle security system, said security system comprising:

a first sensor adapted to detect said disarmed state;

a second sensor adapted to detect the state of the vehicle's ignition;

a third sensor adapted to detect the state of the passive arming switch;

an elapsed-time clock providing a first and a second signal at end of respective first and second predetermined time periods, said second time period being longer than said first time period;

a first device connected to said clock and to said first and second sensors so as to respond to said system being disarmed and said ignition changing from an on to an off ignition state by starting said elapsed-time clock; and a second device responsive to said signal produced by said clock upon reaching the end of said second time period for setting said system in the armed state, and responsive to said third sensor and to said signal produced by said clock upon reaching the end of said first time period so as to respond to the actuation of said passive arming switch when said passive arming switch is actuated before the end of said first time period by setting said security system in the armed state.

2. The system according to claim 1, wherein said second predetermined time period is approximately 10 minutes.

3. The alarm system of claim 1, wherein said first device also responds to said system changing from an armed to a disarmed state while said ignition is in the off state by starting said elapsed-time clock.

4. A method of passively arming a vehicle security system comprising the steps of:

(a) sensing that the system is disarmed;

(b) sensing that the vehicle ignition is turned from on to off while the system is disarmed;

(c) starting a timing of a first time period when the vehicle ignition is turned off;

(d) stopping the timing of the first time period in response to an opening of a vehicle door, a vehicle trunk or a vehicle hood after the timing of the first time period has started;

(e) starting a timing of a second time period, which is longer than the first time period, when the vehicle ignition is turned off, the timing of the second time period continuing despite an occurrence of the opening of the vehicle door, the vehicle trunk or the vehicle hood;

(f) arming the system in response to a completion of the timing of the first time period; and (g) arming the system after the second predetermined time period has elapsed if the system has not been armed in response to the completion of the timing of the first time period.

5. An alarm system for a vehicle having an ignition system, said alarm system having mutually exclusive states including a disarmed state in which the alarm system is not armed and is not sounding, an armed-not-triggered state in which the alarm system is armed but is not sounding, and an armed-triggered state in which the alarm system is sounding, said alarm system comprising:

(a) a state sensor for detecting a change in said alarm system from the armed-not-triggered to the armed-triggered state;

(b) an override switch being operable only when said alarm system is in said armed-triggered state, said override switch being arranged and adapted to stop the alarm from sounding when the alarm is in the armed-triggered state;

(c) a timing circuit adapted to be activated by said override switch while said alarm system is in said armed-triggered state;

(d) an ignition switch separate from said override switch and arranged to start the vehicle's ignition system;

(e) an ignition sensor connected to said ignition switch for supplying a signal when the vehicle's ignition system is turned on;

(f) a controller connected to said state sensor, said ignition sensor, and said timing circuit for switching said alarm system from said armed-triggered state to said disarmed state when said ignition sensor supplies a signal indicating that the ignition system is on while said timing circuit is activated and for maintaining said alarm system in the armed-triggered state when said ignition sensor fails to supply a signal indicating that the ignition system is on while said timing circuit is activated, so that only when the ignition switch is turned on within a predetermined period of time beginning when the override switch is activated, said alarm system changes from said armed-triggered state to said disarmed state.

6. The vehicle alarm system according to claim 5, wherein said predetermined time period is about 30 seconds.

7. A method of passively arming an alarm system comprising the steps of:

(a) sensing that the vehicle ignition is off;

(b) starting a timing of a first time period;

(c) starting a timing of a second time period which is longer than the first time period;

(d) arming the system in response to a completion of the timing of the first time period;

(e) continuing the timing of the second time period despite a vehicle door, a vehicle hood or a vehicle trunk being opened;

(f) arming the system after the second predetermined time period if the system has not been armed in response to the completion of the timing of the first time period.

8. A method for disarming a vehicle alarm system in response to a manual override signal, said alarm system having a controller with a plurality of inputs, a plurality of control outputs, and being activated in accordance with selected inputs, said controller having mutually exclusive disarmed, armed-not-triggered, and armed-triggered states, said method comprising the steps of:

(a) establishing the armed-triggered state;

(b) supplying a manual-override signal to the alarm system, while said system is in said armed-triggered state;

(c) starting an interval timer to measure a predetermined time-delay period, while said system is in said armed-triggered state, wherein the start of said time-delay period is initiated by the simultaneous establishment of said armed-triggered state and the receipt of said manual override signal while said system is in said armed-triggered state;

(d) supplying an ignition-on signal to the alarm system when the ignition system is activated; and (e) disarming said system when said ignition-on signal arrives during said time-delay period.

9. The method according to claim 8, wherein said predetermined time-delay period is about 30 seconds.

10. The method according to claim 9, wherein said signals at steps (b) and (d) are operator-initiated.

* * * * *